United States Patent Office 3,087,834
Patented Apr. 30, 1963

3,087,834
PROCESS FOR VITREOUS ENAMELING OF MAGNESIUM AND ITS ALLOYS
Herbert K. De Long, Midland, and James A. Brown, Essexville, Mich., assignors to The Dow Chemical Company, Midland, Mich., a corporation of Delaware
No Drawing. Filed Apr. 4, 1961, Ser. No. 100,498
8 Claims. (Cl. 117—70)

This invention pertains to a process for porcelainizing or vitreous enamel coating of magnesium and its alloys.

Numerous low temperature vitreous enamels or porcelain compositions have been disclosed which fuse at temperatures low enough to be able to be used on light metals. While these enameling compositions have been successfully used in coating aluminum, they have not been entirely satisfactory in porcelainizing of magnesium. In addition to giving a poor appearance and pitting when applied to magnesium, the adhesion of the coating to the magnesium is not adequate to resist the minor flexing or impact. The coatings are also prone to undercut and spall at bared edges when subjected to such mild environmental conditions as exterior weathering.

It is therefore an object of this invention to provide a process for porcelainizing or coating of magnesium with vitreous enamel such that a good adhesion between the magnesium and the coating is obtained. A further object is to provide a process wherein a vitreous enamel coating obtained on magnesium and its alloys is consistent and of good appearance.

The above and other objects are attained according to the invention by contacting the magnesium with an aqueous solution having a pH in the range of 1.5 to 5 and containing $CrO_3$ anions in an amount of from 0.5 to 6 weight percent based upon the $CrO_3$ content and a sulfate salt selected from the group consisting of alkali metal and alkaline earth metal salts in an amount of from 0.25 to 2 weight percent, based upon the sulfate ion concentration, for a time of from ½ to 5 minutes, rinsing in water, heating the contacted magnesium to a temperature of 800° to 1000° F., cooling the heated magnesium, coating the cooled magnesium with a vitreous enamel slip having a melting point below 1,050° F., and heating the coated magnesium above the melting point of the enamel to fuse and bond the enamel to the magnesium.

By contacting the magnesium with the chrome-sulfate bath of the particular pH and concentration given above and preheating the magnesium prior to coating of the vitreous enamel, the surface of the magnesium is prepared such that a strong bond between the magnesium and the vitreous enamel is obtained which will sustain weathering, flexing and minor impact. The coating obtained is a smooth consistent coating which is generally free of pits and imperfections.

In the process, the magnesium prior to being contacted with the chrome-sulfate solution is degreased using any of the numerous well known solvents and processes for this purpose. After degreasing it is rinsed and then contacted with the chrome-sulfate solution. The magnesium may be dipped, sprayed or other methods used in contacting it with the solution. Normally room temperatures are used and a time of from ½ to 5 minutes is sufficient to obtain the desired action in the bath. Generally a contact time of from ½ to 2 minutes is used. A shorter contact time may be employed if the temperature of the contacting operation is increased say to about 100° C. However, since only a short time is necessary when the solution is at room temperature, higher temperatures for the contacting operation are seldom used.

After the magnesium has been contacted with the chrome-sulfate solution it is rinsed and then prefired to a temperature in the range of 800° to 1000° F., preferably from 950 to 1000° F., to set or form a film on the surface to which the enamel will adhere. The preheating treatment is of short duration sufficient to heat the magnesium surface to the desired temperature. Generally this can be accomplished in a time of from about 1 to 10 minutes, depending to a certain extent upon the size and shape of the magnesium article used. The preheated magnesium is then cooled, coated with the vitreous enamel slip, and further processed according to the various known and accepted methods for applying vitreous enamel to light metals.

Most of the known low temperature porcelain or vitreous enamels used for light metals may be used. Examples of some of these enamels are disclosed in U.S. Patents Nos. 2,911,312 and 2,544,139. The enamels are dispersed in a proper vehicle to form a slip and the surface is coated with the enamel slip in a customary manner, such as by spraying, dipping, stenciling, brushing, and the like. Generally the vehicle for carrying the enamel is preferably air dryable, such as water but a thermally volatile fluid may be used.

The critical steps in preparing the magnesium surface for the enamels is the treatment of the magnesium with the chrome-sulfate bath having a particular limited pH and composition and the preheating steps after the treatment to set or condition the surface or film formed on the surface. The bath composition for treating the magnesium surface prior to coating is an aqueous solution of a chrome compound, such as an alkali metal chromic acid salt or chromic acid, and a sulfate salt of an alkali metal or alkaline earth metal. The bath must have a pH in the range of 1.5 to about 5 and a concentration of the salts within a narrow limit. The concentration of the alkali metal chromic acid salt or chromic acid is in the range of from 0.5 to 6 weight percent, based upon the $CrO_3$ content. The sulfate salt is in the concentration of 0.25 to 2 weight percent, based upon the sulfate ion concentration. The preferred concentrations of the chromic acid ions and the sulfate ions are a function of the pH of the bath. Generally a higher concentration of the ions is preferred at a higher pH. For example for a pH in the range of 3 to 4 or the pH normally obtained with an alkali metal dichromate salt, preferably the chromic acid ion concentration is maintained in the range of 1.5 to 2.0 weight percent and the sulfate ion concentration is in the range of 0.5 to 2 weight percent. With a solution having a pH of 1.5 to 2 or that normally obtained using chromic acid, a bath containing from .25 to 1.5 weight percent of $CrO_3$ and from .75 to 1.0 weight percent of $SO_4$ is preferred.

While the discussion above has been limited to magnesium, it is apparent that magnesium is rarely sold as a pure metal but is alloyed with numerous other constituents. Thus, the term magnesium as used herein means not only elemental magnesium but also alloys thereof which contain about 70 percent by weight or more of magnesium.

To illustrate the invention a number of panels, 3″ x 6″ of .040 inch thick, of magnesium alloy containing 3 percent aluminum, 1 percent zinc, and the remainder magnesium were subjected to different treatments and then coated with a vitreous enamel. These panels were inspected for appearance and tested for spalling.

The panels were all cleaned prior to the performance of the tests by being immersed in an aqueous solution of 6 percent sodium hydroxide and 1 percent of the trisodium phosphate, rinsed with cold water, and then immersed for 1 minute in an aqueous solution containing 28 percent acetic acid and 8 percent sodium nitrate. The panels thus cleaned were rinsed in cold water and subjected to different treatments prior to coating with the porcelain enamel.

After the above cleaning step, a number of the panels were contacted with the chrome-sulfate bath for 2 minutes, rinsed with water and preheated to a temperature of 975° F. for a time of approximately 10 minutes prior to the coating of the panels with the vitreous enamel and firing of the coated panels. The treating bath had a pH of 3.5 and comprised an aqueous solution containing 5 weight percent sodium dichromate and 3 weight percent of chromium potassium sulfate which gave a solution having 1.7 weight percent of $CrO_3$ ions and 1.5 weight percent of the sulfate ions. After the above treatment, the panels were coated with a low temperature lead-free lithium phosphate type vitreous enamel similar to that sold by the Minnesota Mining and Manufacturing Company under the 3M Brand trademark as porcelain enamel #8102. The frit was mixed with a pigment, water, and a milling compound to form a mixture containing 59.2 weight percent of the frit, 3.6 weight percent of a blue-green pigment, 8.9 weight percent of a milling compound recommended for the frit and the balance water. This mixture was ball milled to form a slip which was sprayed on the panels. After spraying the enamel on the panels, the panels were heated to a temperature of 990° F. for 10 minutes and allowed to cool. The coating obtained had an excellent appearance and upon subjecting one of the panels to a spalling test outlined below no spalling was obtained. Only cracking of the enamel to the extent normally obtained with the enamel on aluminum or iron sheeting was obtained.

Upon exposure of one of the panels to a 20 weight percent salt spray for 500 hours no progressive spalling was noted.

One of the panels and an aluminum panel similarly coated were subjected to a rural exterior exposure for 18 months. No differences in effect were observed between the magnesium and aluminum panels.

To show the effects of the chrome-sulfate treatment, panels were treated and coated with the same vitreous enamel as above using the same procedure except that instead of treating the panels with the chrome-sulfate bath the surface was treated with a glycolic-nitrate pickle after cleaning, the glycolic-nitrate bath is the treatment to which most of the commercial magnesium sheeting is subjected after the rolling operation. The appearance of the enamelled surface was poor and in addition spalling occurred upon cooling to the extent that a substantial portion of the panel was free of enamel.

The spalling test employed was the conical mandrel bend test such as described in the American Society for Testing Materials, bulletin ASTM designation, D522–41 adopted in 1941. The conical mandrel test apparatus comprises a conical mandrel with a radius of 5/32" at one end and a radius of 3/4" at the other. A panel 3" x 6" is clamped in the apparatus and bent a prescribed number of degrees around the conical mandrel so as to give a varying radius of curvature from one end of the panel to the other. The amount of spalling or cracking of the vitreous enamel coating was observed and measured on the compression side.

In a manner similar to that described above a panel of a magnesium alloy similar to that above was cleaned in a manner described above and then treated with a chrome-sulfate solution having a pH of about 1.5 and containing 1 percent chromic acid and 0.5 percent calcium sulfate which gave a concentration of $CrO_3$ ion of 1 weight percent and of the sulfate ion of 0.28 weight percent. The panel was treated with the chrome-sulfate solution for 45 seconds, rinsed, prefired for 5 minutes at 975° F., coated with a low temperature lead-type vitreous enamel slip. The enamel slip was prepared in a manner similar to above except that a porcelain enamel frit was of the lead oxide type similar to that sold by the duPont deNemours and Co. as porcelain enamel N360. Upon coating, the panel was heated for 7 minutes at 975° F. to fuse the enamel. A good appearing surface was obtained and in the spalling test no spalling was obtained but only cracking of the enamel.

To show the effects obtained when the magnesium panels are treated and coated with the same vitreous enamel similar to that above with the exception that instead of treating the panels with the chrome-sulfate bath the surface was sand blasted for one of the panels and for the other it was treated for 1 minute in an aqueous solution containing 4 percent hydrofluoric acid and 1½ percent hydrochloric acid. The appearances of the enamelled surface for both of these panels were poor, being pitted and non-uniform. In the spalling test spalling of the enamel was present at an area of from about ½" to 1" in the vicinity of the mandrel for each of the panels.

What is claimed is:

1. A process for the vitreous enameling of magnesium and its alloys, which comprises contacting the magnesium with an aqueous solution having a pH in the range of 1.5 to 5 and containing a chromic compound in an amount of from 0.5 to 6 weight percent, based upon the chromic ion content and a sulfate salt selected from the group consisting of alkali metal and alkaline earth metal salts in an amount from 0.25 to 2 weight percent based upon the sulfate ion concentration, for a time of from ½ to 5 minutes, heating the contacted magnesium to a temperature of 800° F. to 1000° F., cooling the heated magnesium, coating the cooled magnesium with a vitreous enamel having a melting point below 1,050° F. and heating the coated magnesium above the fusing point of the vitreous enamel to fuse and bond the enamel to the magnesium.

2. A process according to claim 1 wherein the chromic compound is an alkali metal dichromate.

3. A process according to claim 1 wherein the chromic compound is chromic acid.

4. A process for the vitreous enameling of magnesium and its alloys, which comprises contacting the magnesium surface with an aqueous solution having a pH of about 3 to 4 and containing an alkali metal dichromate in an amount of from 1.5 to 2 weight percent, based upon the chromic ion content, and an alkaline earth metal sulfate in an amount of from 0.5 to 2 weight percent, based upon the sulfate ion concentration, for a time of from 1 to 2 minutes, heating the contacted magnesium to a temperature of 950° to 1000° F., cooling the heat treated magnesium, coating the cooled magnesium with a vitreous enamel having a melting point below 1,050° F., and heating the coated magnesium above the fusing point of the vitreous enamel to fuse and bond the enamel to the magnesium surface.

5. A process according to claim 4 wherein the alkali metal dichromate is sodium dichromate and the alkaline earth sulfate salt is calcium sulfate.

6. A process for the vitreous enameling of magnesium and its alloys, which comprises contacting the magnesium surface with an aqueous solution of sodium dichromate and chromium potassium sulfate having a pH of about 3 to 4 and a concentration of the chromic ion in the range of 1.5 to 2.0 weight percent and of the sulfate ions in the range of 0.5 to 2 weight percent for a time of ½ to 5 minutes, heating the contacted magnesium to a temperature of 950° to 1,000° F., cooling the heat treated magnesium, coating the cooled magnesium with a vitreous enamel having a melting point below 1,050° F., and heating the cool coated magnesium above the fusing point of the vitreous enamel to fuse and bond the enamel to the magnesium.

7. A process for the vitreous enameling of magnesium and its alloys, which comprises contacting the magnesium surface with an aqueous solution of chromic acid and potassium chromium sulfate having a pH of about 1.5 to 2 and a concentration of the chromic ion in the range of .25 to 1.5 weight percent and of the sulfate ions in the range of .75 to 1.0 weight percent for a time of ½ to 5 minutes, heating the contacted magnesium to a temperature of 950° to 1,000° F., cooling the heat treated magnesium, coating the cooled magnesium with a vitreous enamel having a melting point below 1,050° F., and heating the cool coated magnesium above the fusing point of the vitreous enamel to fuse and bond the enamel to the magnesium.

8. A process for the vitreous enameling of magnesium and its alloys, which comprises contacting the magnesium surface with an aqueous solution of chromic acid and calcium sulfate having a pH of about 1.5 to 2 and a concentration of the chromic ion in the range of .25 to 1.5 weight percent and of the sulfate ions in the range of .75 to 1.0 weight percent for a time of ½ to 5 minutes, heating the contacted magnesium to a temperature of 925° to 975° F., cooling the heat treated magnesium, coating the cooled magnesium with a vitreous enamel having a melting point below 1,050° F., and heating the cool coated magnesium above the fusing point of the vitreous enamel to fuse and bond the enamel to the magnesium.

References Cited in the file of this patent

UNITED STATES PATENTS

| | | |
|---|---|---|
| 2,608,490 | Donahey | Aug. 26, 1952 |
| 2,955,958 | Brown | Oct. 11, 1960 |

FOREIGN PATENTS

| | | |
|---|---|---|
| 558,983 | Great Britain | Jan. 31, 1944 |
| 548,808 | Canada | Nov. 12, 1957 |

OTHER REFERENCES

Le Brocg et al.: "Magnesium Alloy Surface Treatment," Metallurgia, February 1951, pp. 53–61.